United States Patent Office 3,389,037
Patented June 18, 1968

3,389,037
WOOD TREATMENT AND ADHESIVE BONDING AND SEALING TECHNIQUE
Platt Monfort, 18 Edgewood Place,
Huntington Station, N.Y. 11746
No Drawing. Filed Mar. 19, 1965, Ser. No. 441,352
16 Claims. (Cl. 156—305)

ABSTRACT OF THE DISCLOSURE

A method of adhesively bonding a plurality of pre-assembled solid objects involving the application to unexposed portions thereof adjacent their juncture point of a penetrating adhesive having a viscosity of no greater than about 150 cps. A method of sealing a seam between a piece of wood and another solid object involving the application to said seam of a penetrating adhesive having a viscosity of no greater than about 150 cps.

---

This invention relates to methods of treating rotted wood and to a method of bonding solid objects to one another and to sealing seams between them and, more particularly, to such methods involving the use of a penetrating sealing adhesive material.

A major concern in the marine field involves the prevention and treatment of dry rot. Dry rot is a condition which takes place in the wood members of boats and the like which results in the disintegration of the wood fibers to a soft powdery material, the major cause of such dry rot being water which is trapped between wood members at joints, seams and the like. Treatment of dry rot follows two approaches. Where the dry rot has proceeded to a point at which significant destruction of the wood fibers has resulted, it has often been deemed necessary to replace the rotted wood with new wood members. Where the dry rot is detected in its early stages, attempts are usually made to chemically treat the rotted wood in an attempt to arrest further rotting. Regardless of which approach has been followed, the results have left much to be desired.

In accordance with the present invention, applicant has discovered that if wood which has been subjected to dry rot is treated with a penetrating sealing adhesive having certain required characteristics, the dry rot problem is eliminated both in those situations where the extent of dry rotting is extensive and in incipient dry rot situations. In its broad essence, applicant's invention involves the treatment of the rotted wood with a penetrating sealing adhesive which either has a sufficiently low viscosity or is treated to impart to it such sufficiently low viscosity to penetrate into the rotted wood by capillary action. The result is the curing and hardening of the rotted wood into a tough resilient mass which is stronger than the wood itself, effectively rejuvenating the wood for continued use under extremely satisfactory conditions.

As a result of the superb penetrating and sealing characteristics of the adhesive formulations usable in the method of the present invention, it is also within the contemplation of the present application to use such formulations primarily as adhesives to join together two solid objects to be formed into an assembly, be they wood or otherwise. The significance of this adhesive technique is that it is possible to first assemble the solid members to be joined into the desired assembly and to apply the penetrating sealing adhesive to the assembled joints after such assembly. This procedure provides excellent adhesion between component parts of the assembly and greatly facilitates the assembling operation.

It is, accordingly, a primary object of the present invention to provide novel methods for treating dry rot in wood and for bonding together pre-assembled solid elements.

It is another important object of the present invention to provide novel methods for treating dry rot in wood and for bonding together elements of a pre-formed assembly by means of a penetrating sealing adhesive.

It is still another object of the present invention to provide a novel method for treating wood dry rot and for securing together the elements of a preformed assembly with a formulation which effectively eliminates shrinkage problems and, as a result, which eliminates cracking and crazing which might otherwise result.

These and other important objects and advantages of the present invention will become more apparent in accordance with the ensuing description and appended claims.

The novel techniques of the present invention are carried out by treating the wood or other solid objects involved with a penetrating adhesive composition having a viscosity of no greater than about 150 centipoises (cps.), with best results being obtained when the compoistion has a viscosity of 25–75 cps., and, preferably, of 25–50 cps. By using this low viscosity material, the penetrating sealing adhesive will be drawn even through fine hair-line openings by means of capillary attraction. As a result, such compositions can, as previously indicated, be applied to the joints of a pre-formed assembly of solid objects such as wood without first coating the elements of the assembly with the adhesive, and extremely effective adhesion of the members of the assembly to one another will result.

Another important feature of the formulations used in connection with the processes of the present invention is that they are substantially free of solvents or other diluents which, upon their evaporation, will cause any significant shrinkage. The presence of such solvents or diluents would, necessarily, result in undesirable cracking or crazing and/or the formation of a porous mass and would create undesirable stresses and strains on the solid objects to which the formulation is applied. In those situations in which the adhesive formulation has a viscosity greater than the maximum desirable viscosity as pointed out above (150 cps.), the viscosity of the formulation can be reduced without creating shrinkage problems by utilizing only reactive diluents in the reaction mixture, a sufficient quantity of such reactive diluents being added to reduce the viscosity of the formulation to a point no greater than about 150 cps.

Particularly when the formulations used in accordance with the processes of the present invention are utilized for a sealant or seam compound, the formulation utilized should be capable of curing into a thick mass up to 0.1–0.2" in thickness without undesirable effects such as cracking and crazing.

When used for treating dry rot, the formulations of the present invention should be composed so that the final cured adhesive has the proper amount of resilience. Stated differently, the cured adhesive for such purpose should have a capability of elongation up to about 50% before rupturing. In the case of the epoxy systems to be described hereinafter, this can be readily accomplished by using a curing agent which will result in a resilient epoxy cured product. In such cases, the tensile strength of the resulting cured resin will probably lie in the area of about 200–500 p.s.i., with the shear strength being at least about 1000 p.s.i.

For uses in which resilience of the cured adhesive is not important (such as in the manufacture of furniture and the like), both the shear and the tensile strength of the adhesive should be at least 1000 p.s.i. and, preferably, within a range of 1000–3000 p.s.i.

Example I sets forth a typical formulation for use in treating wood dry rot:

EXAMPLE I

Part A

| Description of material: | Quantity |
|---|---|
| ERL 2795 (an epoxy resin of about 500–700 cps. manufactured by the Union Carbide Co.) | 5 lbs. |
| A mixture of 2 part by weight of pentachlorophenol and 5 parts by weight of Araldite RD–1 (manufactured by Ciba) | 1 lb. |
| A mixture of Mod-Epox (a triphenyl phosphate manufactured by Monsanto Chemical) and Maglite-D (A magnesium oxide material) in the proportion of approximately 6 lbs. of Mod-Epox to about 13½ gms. of Maglite-D | 3.5 oz. |
| Araldite RD–1 | 10 oz. |

Part B

| | |
|---|---|
| Hardener (curing agent) for the epoxy resin of Part A (Union Carbide Corporation ZZLZ 0822) | 3 parts of Part A for each 1 part of Part B. |

In the above formulation, the pentachlorophenol is a fungicide particularly useful in connection with the treatment of wood dry rot and the Araldite RD–1 which is used in admixture with it and which has a viscosity of about 3 cps. serves primarily as a solvent for the pentachlorophenol. The main purpose of the Araldite RD–1, which is reflected in the use of 10 oz. of that material, is to serve as a reactive diluent to reduce the total viscosity of the epoxy formulation. The epoxy resin ERL 2795 used in this formulation has a starting viscosity of about 500–700 cps. and the use of Araldite RD–1 reduces this viscosity to a point no greater than the 150 cps. maximum previously mentioned.

The Mod-Epox is also a reactive diluent which further serves as a catalyst to speed up the reaction, particularly when the formulation described above is used in connection with damp wood. Finally, the Maglite-D is a stabilizer for the Mod-Epox, which has a tendency to crystallize in the absence of the use of such a stabilizer.

Best results from the use of a formulation such as has been described above are obtained when the wood is completely saturated with the material. This may be readily accomplished by repeatedly probing the wood parallel to the grain of the wood with a knife or by drilling holes, so as to provide access channels for the resin and greater area for the capillary action which takes place. Such probing also will serve to determine the depth and magnitude of the rot. In areas where the wood has completely rotted, it is advisable to remove any films of paint or varnish from the surface of the wood for a more thorough penetration.

The above formulation will begin to gel within one-half to one hour after application, depending upon the temperature; the higher the temperature the faster the cure. It will solidify into a tough, resilient mass overnight with one week preferably being allowed for the obtaining of ultimate strength.

This formulation can also be used on damp wood. However, it will not displace actual water in soaking wet wood. Best results are obtained when the affected area is dried as much as is practicable, soaking the wood with acetone assisting in the drying.

Quite obviously, the proportions of materials such as those described above may vary within reasonable limits provided the ultimate viscosity of the material is maintained at a point no greater than the 150 cps. level previously described and, preferably, substantially below that level. Acceptable results are obtained, for example, using a reactive diluent in a quantity amounting to about 10–30% by weight of the epoxy resin portion of the formulation where the epoxy resin has a starting viscosity of about 500–700 cps. When the Mod-Epox is used as part of the reactive diluent, this can constitute from about 5–20% of the weight of the epoxy resin. When a fungicide such as pentachlorophenol is used, it should be used in relatively small quantities, such as about 4–6% by weight of the epoxy portion of the system.

The hardener used in the above system will provide a cured resin product which has substantial resilience and which will permit elongation of the cured resin up to 50% before it ruptures. Its tensile strength will be approximately 200–500 p.s.i. and its shear strength about 1000 p.s.i. This formulation will also permit the curing of the resin into a thick mass at least up to 0.1–0.2″ in thickness without any cracking or crazing. Because of its penetrating action, formulations such as those described above will thoroughly impregnate rotted wood and will, in effect, petrify (encapsulate) the rotten wood fibers, effectively utilizing the wood fibers as a filler for the resin.

A formulation substantially identical to that set forth in Example I (the only modification being that 27 gms. of the Maglite-D were utilized in the Mod-Epox formulation rather than 13½ gms.) was found to have particularly advantageous results in its ability to penetrate wood as compared with various other materials utilized for such test purposes. For example, a given piece of wood was found to be penetrated to a certain depth by water in approximately 2 minutes. The reactive diluent Araldite RD–1 penetrated the wood to approximately the same extent also in 2 minutes. The formulation of Example I (modified as stated above) penetrated the wood to the same extent in approximately 5 minutes. On the other hand, the ERL 2795 epoxy resin utilized in Example I penetrated to a point only one-quarter the depth of the maximum penetration achieved by the formulation of Example I in approximately 8 hours. Since the viscosity of both the water and Araldite RD–1 utilized in this comparative test is significantly less than that of the formulation of Example I, this test illustrates the excellent penetrating characteristics of the latter.

Another formulation which is particularly adapted as an adhesive for securing a plurality of objects to one another in a pre-formed assembly is set forth below in Example II.

EXAMPLE II

Part A

| Description of material: | Parts by weight |
|---|---|
| Maglite-D | 0.3 |
| Mod-Epox | 9.7 |
| Epoxy Resin ERL 2795 | 64.6 |
| Tergitol-TMN | 0.77 |
| Araldite RD–1 (a butyl glycidyl ether, manufactured by Ciba) | 13.7 |

Part B

| | |
|---|---|
| Hardener (curing agent), diethylene triamine (Ciba resin No. 95) | 11.2 |

In the above formulation, the Araldite RD–1 serves as the reactive diluent with the Mod-Epox serving as a secondary reactive diluent but having the primary function of catalyst for the reaction. The epoxy resin is that used in Example I with the Maglite-D serving as before as a stabilizer for the Mod-Epox. The tergitol-TMN is a non-relative wetting agent.

The curing or hardening agent used in the above example produces a result different from that obtained from its counterpart in Example I in that the former does not have the resilience possessed by the latter in the form of the cured resin. While the shear strength of the resin of Example II is the same as that of Example I (about 1000 p.s.i.), its tensile strength is significantly higher (being at least 1000 p.s.i.).

The viscosity of the formulation of Example II after mixture of Parts A and B in the suggested portions will be about 75–100 cps. As such, this formulation is extremely advantageous for securing a plurality of solid objects (wood or otherwise) to one another. Because of the tremendous penetrating and sealing action of this resin, the objects to be secured to one another may be preassembled and the formulation applied at their joints. Through capillary action, it will be drawn even into hairline cracks and do an extremely effective job of adhering and sealing.

Quite obviously, the respective proportions of materials utilized in this formulation may be varied within the limitations previously suggested.

It will be apparent to those skilled in the art that it is within the contemplation of the present invention to vary the specific identity of the exact materials utilized without losing the advantages of the present invention within the limitations heretofore defined. For example, in lieu of an epoxy resin system, other adhesive systems could be utilized, such, for example, as the urethane systems known to those skilled in the art, though the epoxy system of the present invention has been found to be particularly advantageous for the desired purpose. As will also be apparent, when reactive diluents are necessary to reduce the viscosity of the adhesive system to the desired degree, other diluents than butyl glycidyl ether can be utilized so long as the diluent furnishes active hydrogen groups. For example, almost any of the glycidic esters or ethers may be utilized, another example of such materials being allyl glycidyl ether. Similarly, where epoxy systems are used, other curing agents than those set forth may be utilized, depending upon the results to be obtained (i.e., a resilient cured resinous mass versus one which is not so resilient). For example, the aliphatic amines are generally useful, as are the polyamides. Examples of useful curing agents are triethylenetetraamine, ethanol amines, di- and triethanol amines and other polyethanol amines, etc. Similarly, other wetting agents may be utilized if deemed desirable, including any of the conventional quaternary wetting agents such as the benzalkonium quaternary salts and the various silicone wettings agents.

The penetrating sealing adhesives of the present invention are particularly useful in treating the end grains of wood since such end grain portions of the wood provide ready access ports through which the adhesive can penetrate. This renders such adhesive materials particularly useful in the bonding together of wood planking and the like used for marine purposes. In the boat-building field, much of the wood is plywood, the edges of which are quite susceptible to water attack. The plurality of lamina of which the plywood sheet is made exaggerates the water attack problem, often resulting in rot and delamination of the plywood plies and general degradation of the wood. By applying the penetrating adhesive materials of the present invention to the end grains of such plywood at the time the plywood is incorporated into the boat, the adhesive will soak up into the plywood by capillary action and provide extremely effective protection to the wood against dry rot while at the same time serving as an adhesive material which will bond the wood to other wood portions or to non-wood portions of the vessel. As previously indicated, because of the penetrating nature of the adhesive, the elements of the vessel (or other structure being treated) may be pre-assembled with the penetrating adhesive material being applied at exposed joints.

Similarly, where a portion of a piece of wood adjacent a joint or seam (the term "seam" is intended when used in this specification and claims to include seams, cracks and other joints between two solid elements or portions thereof) has rotted, the adhesive composition will serve not only to eliminate the rot problem by effectively encapsulating the rotted wood portion but will also serve as a sealer or joining agent between the solid elements being treated.

Where a plurality of joints are to be treated by the penetrating sealing adhesive of the present invention, it is advisable not to apply such adhesive at all joints at once since this will trap air in the system and militate against the capillary action which would otherwise be effective to draw the adhesive into the wood or other solid element. The adhesive is preferably applied to a single joint at a time and, as the adhesive is seen to migrate into the solid object being treated (which can be determined by looking at the edge of the joint), additional adhesive is added until the object is saturated to the desired degree.

As will be apparent, the penetrating sealing adhesives of the present invention are particularly useful for marine purposes, not only for preventing dry rot by eliminating the basic cause of such rot (trapped fresh water) through the application of the adhesive to all seams, joints, checks, splits, and the like but for repairing dry rot which has previously taken place. The low viscosity of the adhesive composition has an extraordinary wetting ability which enables it to soak in and completely saturate the rotted wood, the adhesive curing and hardening into a tough resilient mass when properly constituted. The adhesive formulation of the present invention can also be used for refastening purposes. The penetrating action of the formulation will enable it to flow all around a fastening, subsequently providing a perfect fit between the fastening (ordinarily metal) and the wood to which it is attached. Such formulations can also be used to restore weathered, checked or dried out wood through a generous soaking of such wood with them. The adhesive material can also be used strictly as an adhesive for items such as windshield frames, hatches, skylights, coamings and other fixtures normally on a boat without the necessity for costly disassembly. Obviously, the material can also be used for preventing leaks and other similar problems encountered in the marine field.

Outside of the marine field, the adhesive formulations of the present invention can be used for a multitude of uses, including the assembling of new and repaired furniture, tool and fixture work, etc.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A method of adhesively bonding a plurality of solid objects to be incorporated into an assembly comprising the steps of combining said solid objects to form said assembly and thereafter applying to said solid objects, at least one exposed portion thereof immediately adjacent the point at which they join one another in said assembly, a penetrating adhesive composition having a viscosity of no greater than about 150 cps. and which adhesive composition, after it has cured, will have minimum tensile and shear strengths of about 1000 p.s.i.

2. A method as defined in claim 1 wherein said adhesive, at the time it is applied to said solid objects, is substantially free of any non-reactive solvents which would cause said adhesive to shrink upon the evaporation of said solvents.

3. A method as defined in claim 1 wherein at least one of said solid objects is wood.

4. A method as defined in claim 1 wherein said adhesive is an epoxy resin.

5. A method as defined in claim 4 wherein the viscosity of said epoxy resin is reduced to a point no greater than about 150 cps. by the addition thereto of at least one reactive diluent.

6. A method as defined in claim 1 wherein said exposed portion is a hair-line opening between said solid objects and wherein said adhesive is drawn into said hair-line opening by means of capillary action.

7. A method of adhesively bonding a plurality of wood pieces to be formed into an assembly comprising the steps of assembling said wood pieces into said assembly and thereafter applying to said assembled wood pieces, at at least one exposed portion thereof immediately adjacent the point at which they join one another in said assembly, a pentrating adhesive compostion having a viscosity no greater than about 150 cps. and which adhesive composition, after it has cured, will have minimum tensile and shear strengths of about 1000 p.s.i., said adhesive at the time it is applied to said wood pieces being substantially free of any nonreactive solvents which would cause said adhesive to shrink upon the evaporation of said solvents.

8. A method of adhesively bonding a plurality of solid objects to be incorporated into an assembly comprising the steps of combining said objects to form said assembly and thereafter applying to said solid objects, at at least one exposed portion thereof immediately adjacent the point at which they join one another in said assembly, a penetrating adhesive composition having a viscosity of no greater than about 150 cps.

9. A method as defined in claim 8 wherein said composition has a viscosity of about 25–75 cps.

10. A method as defined in claim 8 wherein said composition has a viscosity of about 25–50 cps.

11. A method of sealing a seam between a piece of wood and another solid object comprising applying to said seam an epoxy composition comprising an epoxy resin and a curing agent for said resin, said composition having a viscosity of no greater than about 150 cps. and being substantially free of diluents which, upon their evaporation, will cause said composition to shrink or to form into a porous mass, said composition after it is cured having an elongation capacity of at least about 50% before rupturing.

12. A method as defined in claim 11 wherein said composition contains at least one reactive diluent to maintain its viscosity at a point no greater than about 150 cps.

13. A method as defined in claim 11 wherein the viscosity of said composition is about 25–75 cps.

14. A method as defined in claim 11 wherein the viscosity of said composition is about 25–50 cps.

15. A method of sealing a seam between a piece of wood and another solid object comprising applying to said seam a penetrating adhesive composition having a viscosity of no greater than about 150 cps. and being substantially free of diluents which, upon their evaporation, will cause said composition to shrink or to form into a porous mass, said composition after it is cured having an elongation capacity of at least about 50% before rupturing.

16. A method as defined in claim 15 wherein at least a portion of said wood is rotted and wherein at least a portion of said composition is applied to said rotted wood portion.

References Cited

UNITED STATES PATENTS

| | | | |
|---|---|---|---|
| 1,597,538 | 8/1926 | Novotny et al. | 156—305 X |
| 2,512,996 | 6/1950 | Bixler | 161—184 X |
| 2,847,343 | 8/1958 | Kohn | 161—184 X |
| 3,159,595 | 12/1964 | Parry | 161—184 X |

HAROLD ANSHER, *Primary Examiner.*